C. T. LUDWIG.
INSTRUMENT FOR TAKING BERTILLON MEASUREMENTS.
APPLICATION FILED FEB. 24, 1914.
1,129,699.
Patented Feb. 23, 1915.
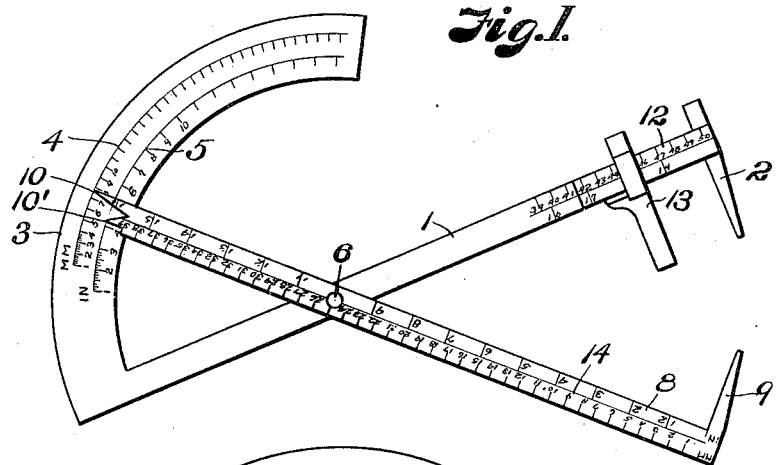
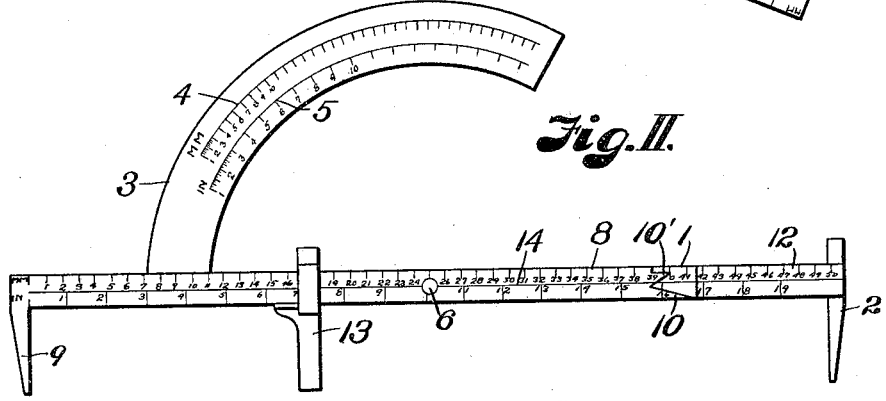
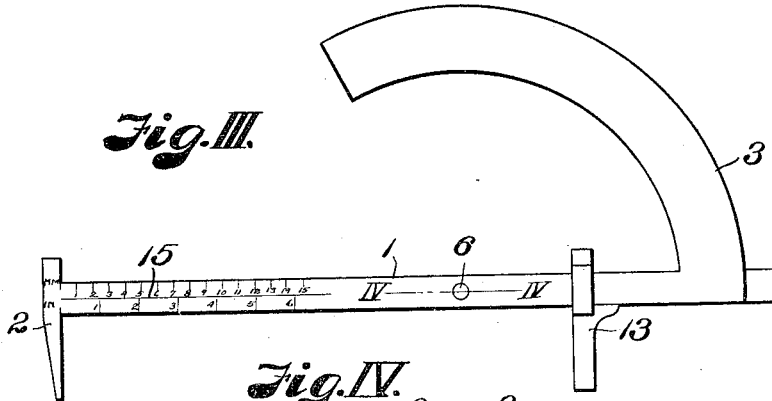
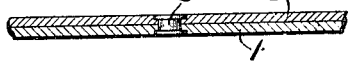
WITNESSES:
Arthur W. Caps.
Lynn R. Robinson.
INVENTOR
C. T. Ludwig.
ATTORNEY

UNITED STATES PATENT OFFICE.

CHARLES T. LUDWIG, OF KANSAS CITY, MISSOURI.

INSTRUMENT FOR TAKING BERTILLON MEASUREMENTS.

1,129,699. Specification of Letters Patent. Patented Feb. 23, 1915.

Application filed February 24, 1914. Serial No. 820,475.

*To all whom it may concern:*

Be it known that I, CHARLES T. LUDWIG, a citizen of the United States, residing at Kansas City, in the county of Jackson and State of Missouri, have invented certain new and useful Improvements in Instruments for Taking Bertillon Measurements; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an instrument for taking Bertillon measurements, and has for its principal object to provide a single instrument with which all of the measurements required in said system, may be taken, and thereby obviate the necessity for separate instruments for securing the different measurements.

It is also an object of the invention to provide a measuring device of this character of the smallest possible dimensions, in order that it may be carried on the person of an officer, if desired, and may be easily handled while the measurements are being taken.

In accomplishing these objects, I have provided improved details of structure, the preferred forms of which are illustrated in the accompanying drawings, wherein:—

Figure I is a plan view of a measuring device constructed according to my invention, illustrating its use as a caliper for taking head measurements. Fig. II is a plan view of the device, showing the bars in position for taking foot and arm measurements, and illustrating the use of the slide. Fig. III is a view of the opposite side of the device, showing the scale for finger and ear measurements. Fig. IV is a longitudinal section showing the caliper bars overlying each other, and illustrating the built-up construction of the body bar. Fig. V is a perspective view of the slide.

Referring more in detail to the parts:—1 designates the body of the caliper, 2 a caliper head, which is fixed to one end of said body and adapted for coöperation with an arm pivotally mounted thereon, and 3 a segment that projects laterally from the opposite end of the body, and is provided with metric and English scales 4—5 that lie adjacent each other on the same side of the segment and are concentric with a pin 6 on the body bar 1.

Pivotally mounted on the body 1, by means of the pin 6, is a caliper arm 8 having a head 9 at one end adapted for coöperation with the head 2 on the body bar for taking the diameters of objects, or like measurements, and having a double pointer 10—10' at its opposite end adapted for travel over the scales 4—5 on the segment 3. The indicator portion of the arm 8 is shorter than the caliper head arm, in order that relatively large objects may be measured without the necessity for extending the length of the device, and in order to secure correct measurements, the scales 4—5 are graduated in proportion to the offset of the caliper arm on its mounting, so that while they indicate the measurement, taken by the caliper, correctly in figures, the spaces between the figures are less than the actual dimensions indicated thereby.

As the body and caliper arm 1—8 are of equal length, and the indicating section 8' of said caliper arm is shorter than the opposite section, the indicating section will terminate short of the body arm when the parts are turned to overlie each other. In order to provide an unbroken surface for securing measurements when the parts are in the last named position, I provide the caliper head end of the body 1 with a built-up portion 12 of the same thickness as the caliper arm 8, so that when the parts overlie a slide 13 may move smoothly along the device and over the ends of the caliper arm, or built-up section of the body.

In order to secure measurements of the arm, or a like member, the caliper arm 8 is turned on its pivot until it overlies the body arm and the slide 13 may move therealong to contact the elbow or tip of the finger; the caliper arm being provided with a metric and English scale 14 preferably starting at the free end of the arm and continuing off of the caliper arm onto the body and built-up section 12 so that measurements may be taken of an object having the full length of the combined caliper and body arm.

While all length measurements to be taken with the device might be secured from the top of the instrument, as heretofore described, it is a matter of convenience to provide a scale 15 on the opposite side or back of the body adjacent the caliper head 2, so that the caliper head and slide may be utilized in taking measurements of the ear, fingers, etc.

In using the instrument, presuming the parts to be constructed and assembled, as described, the slide 13 is normally placed over the pivotally connected body and arm members 1—8 to hold same in alinement, so that they may occupy a minimum space. When a series of measurements is to be taken, the slide is moved back off of the arm 8 onto the built-up part 12 of the body, and the caliper pivoted on its mounting so that the heads 2—9 may coöperate in taking caliper measurements; the result of such measurements being indicated by the pointers on the segmental scales 4—5, the scales being so arranged that correct measurements in millimeters and inches may be indicated simultaneously. After the caliper measurements have been taken, the caliper arm is moved about its pivot to overlie the body arm 1 and the continuous scale on the caliper and body arms are used in taking length measurements; the slide 13 being moved along the body and caliper arm to coöperate with the head 9 in securing such measurements. The smaller measurements such as those for the ears and fingers may be taken by coöperative use of the slide and caliper head 2, which read on the scale on the back of the device.

Having thus described my invention, what I claim as new and desire to secure by Letters-Patent, is:—

1. An instrument of the character described, comprising a body member having a scale at one end, an arm pivotally mounted on the body member and having a scale forming a continuation of the scale on the body member when said arm and member are in alinement, and a slide adapted for travel over the body member and arm.

2. An instrument of the character described, comprising a body member having an upstanding part at one end, an arm pivotally mounted on the body member and having an end section terminating adjacent the said part, when the member and the arm are alined; the said arm being provided with a scale and the said part with a scale continuing that on the arm, and a slide adapted for travel over the said part and onto the arm when the latter is in alinement therewith, substantially as set forth.

3. In an instrument of the character described, the combination with pivotally mounted arms having caliper heads at their respective ends, and one of the arms having a short section, and a slide adapted for travel on the said arm when alined for measuring coöperation with either of the caliper heads, substantially as set forth.

4. The combination with a body member having an arm pivotally mounted thereon, the arm and body member having continuing scale graduations, and the said body being provided with a scale on its opposite face, caliper heads on the ends of the body and arm, and a slide adapted for travel on the body and arm and for coöperation with either of the caliper heads to indicate measurement from either of said scales.

5. An instrument of the character described comprising a body member having straight-edge scale markings at one end and a quadrant projecting laterally from the opposite end and provided with segmental scale markings, a caliper head on said body member adjacent said straight scale markings, a slide on said body member adapted to coöperate with said caliper head and straight scale markings, an arm pivotally mounted on said body member, and having a pointer adapted for coöperation with the segmental scale markings on the quadrant and having a caliper head at the opposite end adapted for coöperation with the caliper head on the body member.

6. An instrument of the character described comprising a caliper having pivotally mounted arms provided with caliper heads, and a slide on one of said arms adapted to coöperate with an adjacent head, for the purpose set forth.

In testimony whereof I affix my signature in presence of two witnesses.

CHARLES T. LUDWIG.

Witnesses:
ARTHUR W. CAPS,
L. E. COATS.

Copies of this patent may be obtained for five cents each, by addressing the "Commissioner of Patents, Washington, D. C."